12) United States Patent
Kuhls et al.

(10) Patent No.: US 7,584,350 B2
(45) Date of Patent: Sep. 1, 2009

(54) METHOD FOR BOOTING UP SOFTWARE IN THE BOOT SECTOR OF A PROGRAMMABLE READ-ONLY MEMORY

(75) Inventors: Burkhard Kuhls, Stadtbergen (DE); Thomas Kalverkamp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 415 days.

(21) Appl. No.: 11/315,186

(22) Filed: Dec. 23, 2005

(65) Prior Publication Data

US 2007/0005948 A1    Jan. 4, 2007

Related U.S. Application Data

(63) Continuation of application No. PCT/EP2004/004664, filed on Apr. 29, 2004.

(30) Foreign Application Priority Data

Jun. 24, 2003   (DE) ................. 103 28 529
Dec. 3, 2003    (DE) ................. 103 57 032

(51) Int. Cl.
    *G06F 15/177* (2006.01)
(52) U.S. Cl. ............... 713/2; 713/1; 713/100; 713/187
(58) Field of Classification Search .......... 713/2, 713/1, 100
    See application file for complete search history.

(56) References Cited

U.S. PATENT DOCUMENTS

| 5,568,641 | A | * | 10/1996 | Nelson et al. ............. 713/2 |
| 5,579,522 | A | * | 11/1996 | Christeson et al. ......... 713/2 |
| 5,844,986 | A |   | 12/1998 | Davis |
| 5,937,063 | A | * | 8/1999  | Davis ................... 713/187 |
| 6,009,524 | A |   | 12/1999 | Olarig et al. |
| 6,138,236 | A | * | 10/2000 | Mirov et al. ............. 726/26 |
| 6,266,809 | B1|   | 7/2001  | Craig et al. |

(Continued)

FOREIGN PATENT DOCUMENTS

DE    197 04 531 C1    4/1998

(Continued)

OTHER PUBLICATIONS

German Search Report dated Mar. 22, 2004 with English translation of relevant portion.

(Continued)

*Primary Examiner*—Nitin C Patel
(74) *Attorney, Agent, or Firm*—Crowell & Moring, LLP

(57) ABSTRACT

A method of booting up update software in a writable memory area of a boot sector of a programmable control device of a vehicle is provided. The method Provides a boot-up software that can be booted up in a writable memory area of the programmable control device which is situated outside the boot sector. The boot-up software is capable of controlling, in the control device, the installation of the update software in the writable memory area of the boot sector, booting up the boot-up software and the update software in the writable memory area situated outside the boot sector, and executing the boot-up software in the control device in order to install the update software in the writable memory area of the boot sector.

21 Claims, 2 Drawing Sheets

U.S. PATENT DOCUMENTS

| | | | |
|---|---|---|---|
| 6,275,931 B1 * | 8/2001 | Narayanaswamy et al. | 713/2 |
| 6,308,265 B1 * | 10/2001 | Miller | 713/2 |
| 6,581,159 B1 | 6/2003 | Nevis et al. | |
| 6,615,404 B1 * | 9/2003 | Garfunkel et al. | 717/173 |
| 6,732,267 B1 * | 5/2004 | Wu et al. | 713/100 |
| 6,789,158 B2 * | 9/2004 | Takahashi | 711/103 |
| 7,069,452 B1 * | 6/2006 | Hind et al. | 713/1 |
| 7,197,637 B2 * | 3/2007 | Schmidt et al. | 713/157 |
| 7,337,309 B2 * | 2/2008 | Nguyen et al. | 713/1 |
| 7,356,682 B2 * | 4/2008 | Lampson et al. | 713/2 |
| 2002/0073316 A1 | 6/2002 | Collins et al. | |

FOREIGN PATENT DOCUMENTS

| | | |
|---|---|---|
| DE | 197 50 365 A1 | 5/1999 |
| DE | 100 08 974 A1 | 9/2001 |
| DE | 101 12 056 A1 | 9/2002 |
| DE | 101 31 395 A1 | 1/2003 |
| DE | 101 41 737 C1 | 4/2003 |
| EP | 0 816 970 A2 | 1/1998 |

OTHER PUBLICATIONS

International Search Report dated Sep. 14, 2004—with English translation.

* cited by examiner

Fig. 1a
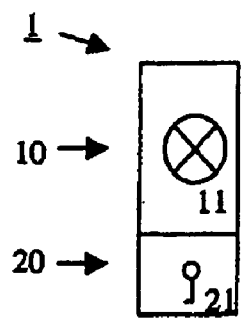
Fig. 1b
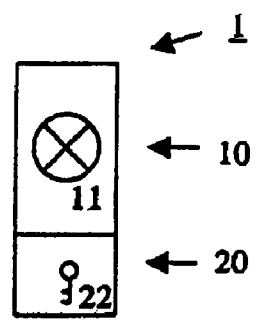
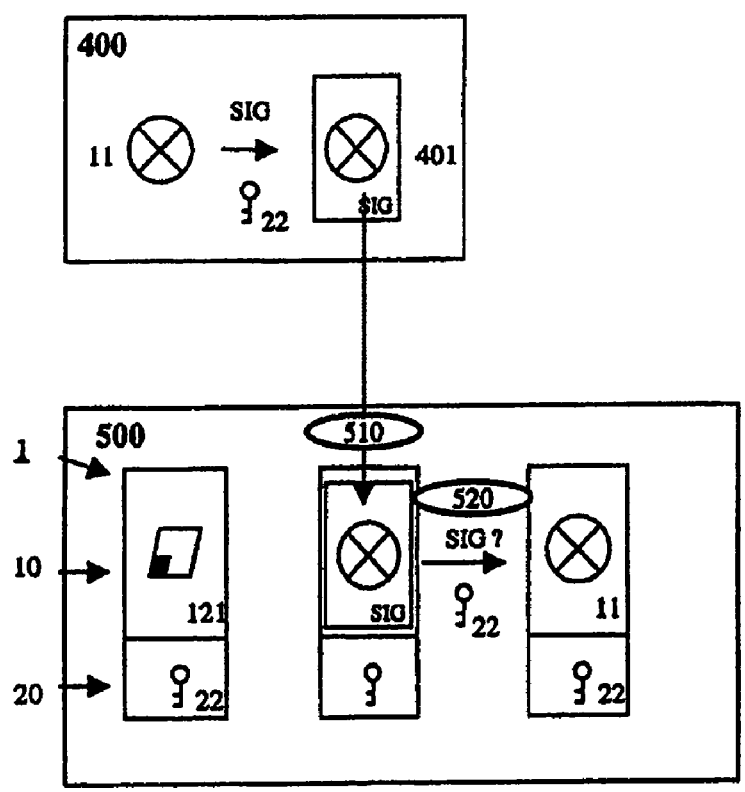
Fig. 3

METHOD FOR BOOTING UP SOFTWARE IN THE BOOT SECTOR OF A PROGRAMMABLE READ-ONLY MEMORY

This application is a Continuation of International Patent Application No. PCT/EP2004/004664 filed Apr. 29, 2004, the entire disclosure of which is herein expressly incorporated by reference. The present application claims priority under 35 U.S.C. § 119 to German Patent Application No. 103 28 529.6 filed on Jun. 24, 2003, the entire disclosure of which is herein expressly incorporated by reference. The present application also claims priority under 35 U.S.C. § 119 to German Patent Application No. 103 57 032.2 filed on Dec. 3, 2003, the entire disclosure of which is herein expressly incorporated by reference.

BACKGROUND AND SUMMARY OF THE INVENTION

The invention relates to a method for booting up an update software in a writable memory area in the boot sector of a programmable control device of a vehicle.

German Patent Document DE 100 00 8974 A1 discloses a method for booting up software in a writable memory area of a programmable control device of a vehicle. In this method a software to be imported is signed against falsifications by means of a public-key process using a first key of a complementary pair of keys before the software is transmitted into the control unit. After the signed software to be imported is transmitted into the control device, it is checked with respect to its integrity by the latter using a second key of the pair of keys.

The signature process prevents the software from being booted up into the control device in a uncontrolled manner. However, this process requires the presence of a safety mechanism in the control device, in which the safety mechanism carries out the above-mentioned checking of the signed software to be imported. In order to offer effective safety, this safety mechanism itself has to be protected from unauthorized interventions.

For this purpose, the above-mentioned safety mechanism is normally embedded in the boot sector of the control device and the boot sector is generally protected against later software changes. The boot sector is protected by being situated in a memory area (ROM) of the control device, which is not writable. The memory content cannot be changed later and is thus secured against unauthorized interventions. This has the disadvantage that the boot sector is inaccessible also for authorized interventions. Thus, programming errors cannot be eliminated, safety mechanisms cannot be updated, and keys, which may have become known, cannot be exchanged in such a control device. It is also not possible to restore the boot sector after changes caused by uncontrolled physical effects or aging effects—a so-called "bit tilting". Thus, the known method cannot be used for importing software into the boot sector of such a control device.

In order to overcome this disadvantage, the boot sector can be embedded in a changeable non-volatile memory chip, such as Flash memory. However, then the boot sector has to be secured against unauthorized interventions in a different manner.

Known protection mechanisms for securing the boot sector are unsatisfactory. A method is known, for example, from U.S. Patent Document U.S. Pat. No. 5,937,063 by which boot-up firmware, such as BIOS, is protected against an unauthorized intervention by being embedded in a secured booting device. This booting device interacts with a host processor during the booting, the boot-up instructions being encrypted and decrypted by using a secret key which the secured booting device and the host processor utilize jointly. This very complex method is too expensive and, on the whole, unsuitable for control devices in a vehicle. In addition, the object of being able to update the control-device-side safety mechanism, such as the above-mentioned secret key, is not achieved.

U.S. Patent Document U.S. Pat. No. 5,825,878 discloses a method by which the transmission of instructions and data into a control device takes place in an encrypted form and safety mechanisms used for this purpose are embedded on the control device side, at least partially in a physically secured unit. However, the control-device-side safety mechanism, such as a secret key, cannot be updated.

It is an object of the invention to provide a method for booting up an update software in a writable memory area of a boot sector of a programmable control device of a vehicle, which overcomes the above-mentioned disadvantages and, in particular, makes it possible to be able to update also control-device-side safety mechanisms in the boot area in a secured manner.

In accordance with exemplary embodiments of the present invention, boot-up software is provided that can be booted up in a writable memory area of the programmable control device which is situated outside the boot sector. The boot-up software is capable of controlling, in the control device, the installation of the update software in the writable memory area of the boot sector. The boot-up software and the update software are booted-up in the writable memory area situated outside the boot sector. The boot-up software is executed in the control device in order to install the update software in the writable memory area of the boot sector.

In accordance with exemplary embodiments of the present invention, the boot area is designed by means of known mechanisms such that it cannot be accessed directly but only by means of boot-up software provided especially for this purpose. The execution of the boot-up software, by which the actual installation of the update software in the boot area is controlled, can then take place as a function of suitable safety criteria.

It may, for example, be provided that the execution of the boot-up software is permitted only while taking into account safety mechanisms already existing in the control device for the booting-up of applications in the control device. On the other hand, new safety mechanisms may also be entered into the control device together with the boot-up software, which update or supplement the safety mechanisms present in the control device. As a result, the booting-up of the update software can be secured by newly introduced safety mechanisms.

Although boot-up and update software could in principle be booted separately into the control device, it is usually more advantageous for the update software to be contained in the boot-up software because this increases the complexity at the front end of the boot-up operation without making the actual boot-up operation more difficult, and thereby increases the degree of safety of the overall concept without reducing the user friendliness.

A particularly favorable variant of the method according to the invention is characterized in that a signature process is applied to at least a portion of the boot-up software and/or of the update software. In this case, the software is signed before its transmission into the control device by means of a first signature key, and after its transmission into the control unit, it is checked with respect to its integrity by means of a second signature key filed in the control device. As a result, it can be ensured that only boot-up software authorized by the user of the first signature key and not further modified after the signing can be executed in the control device. In the event of a failing of the signature check, for example, the concrete execution of the boot-up software can be prevented. However, as an alternative, the loading of the boot-up software into the control unit can already be made to be a function of a successful signature check. The second signature key is preferably filed in the writable memory area of the boot sector. This permits a secured checking within the control device. After a successful signature check, the signature key itself can also be the object of the updating of the boot area.

An asymmetrical signature process can be used for the signing and signature checking, the first and the second signature key forming a complementary pair of keys. For example, the so-called public-key process is such an asymmetrical process. In an alternative variant of the method according to the invention, a symmetrical signature process is used, in which the first and the second signature key are identical.

In addition, or as an alternative to the above-explained signature process, in a particularly advantageous further development of the method according to the invention, it can be provided that at least a portion of the boot-up software and/or of the update software, before the transmission into the control device, is encrypted by means of an encryption key and, after the transmission into the control device, is decrypted by a decryption software by means of a decryption key filed in the control device. This is particularly advantageous if the actual information to be used in the boot area, that is, the update software or its significant fractions, are part of the encrypted software portion. This ensures that unauthorized parties can obtain no knowledge of the new data, which is particularly important when, for example, a key filed in the boot area is to be exchanged or updated.

In a manner comparable to the above-explained signature process, it is preferred that the decryption key is filed in the writable memory area of the boot sector. This permits a secured check within the control device. After a successful decryption, the decryption key itself may also be updated in the boot area.

Also in a manner comparable to the above-explained signature process, an asymmetrical encryption process can be used, the encryption key and the decryption key forming a complementary pair of keys. As an alternative, it may also be provided that a symmetrical encryption process is used, in which case the encryption key and the decryption key are identical.

Advantageously, the decryption software is contained in the boot-up software and is loaded into the control device with the update software (if required). The advantage is the increase of the degree of complexity of the overall system and thus, the increase of safety without any reduction of the user friendliness or any required increase of the device complexity.

In systems with a signature and encryption of at least portions of the boot-up and/or of the update software, in the simplest case, the same key is used for the signing and encryption and for the signature checking and decryption respectively. In the symmetrical case only one key is used, and in the asymmetrical case only a complementary pair of keys are used. However, as an alternative, it may be provided that different pairs of keys of identical or complementary keys are used for the signature process and for the encrypting and decrypting.

The method according to the invention makes it possible to update, in a secured manner, data in the boot area, which, for example, also may comprise keys filed there for special safety mechanisms. Also control devices which are impaired by "bit tilting" in the boot sector can be refreshed by the booting-up of lost memory contents.

BRIEF DESCRIPTION OF THE DRAWINGS

FIG. 1a is a schematic representation of a programmable control device with its memory contents before the implementation of the method according to exemplary embodiments of the invention;

FIG. 1b is a schematic representation of a programmable control device with its memory contents after the implementation of the method according to exemplary embodiments of the invention;

FIG. 3 is a schematic representation of process steps following the process steps of FIG. 2 in accordance with exemplary embodiments of the invention.

DETAILED DESCRIPTION OF THE DRAWINGS

Figure 2:
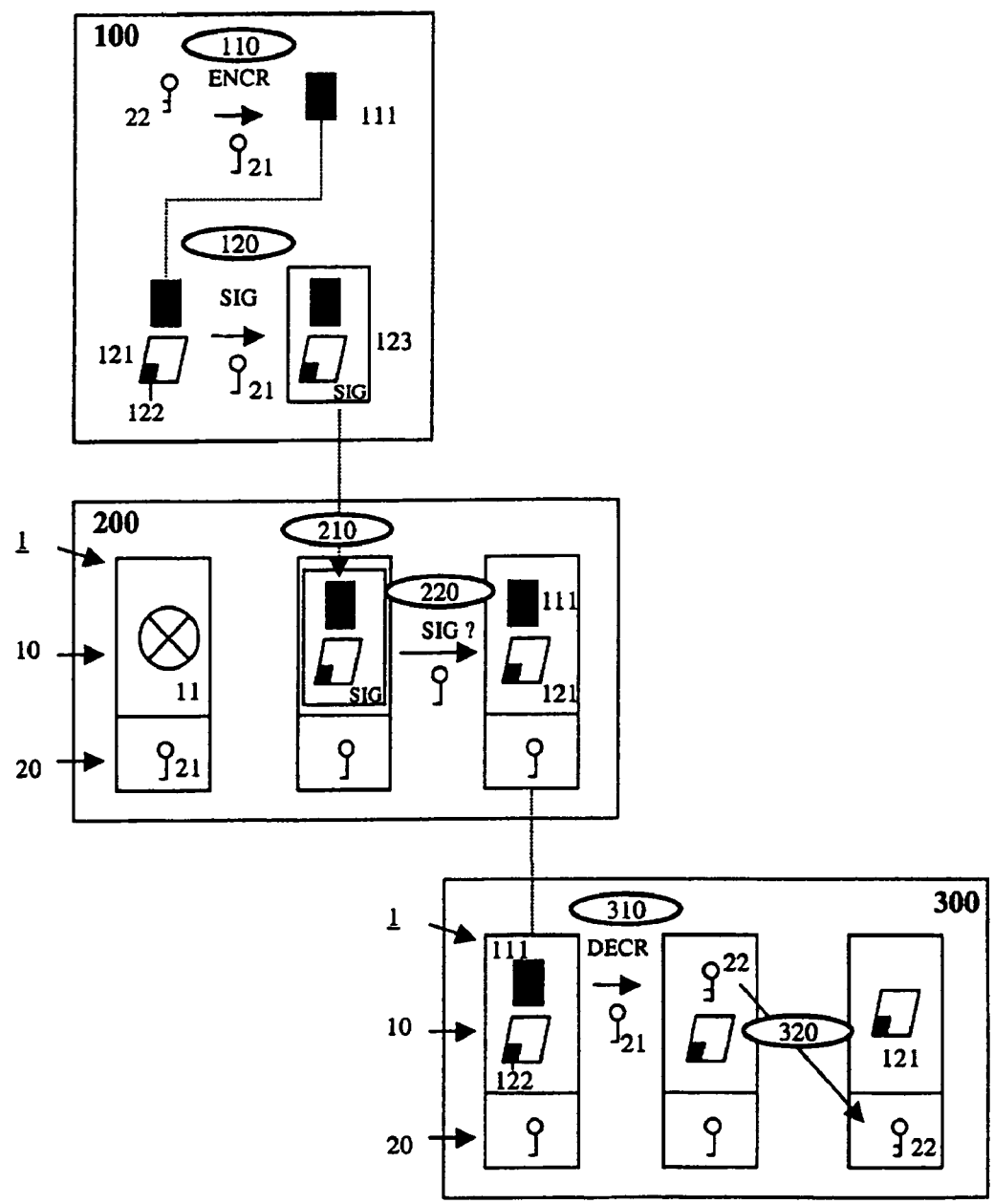
FIG. 2 is a schematic representation of the process steps of an embodiment of the method according to exemplary embodiments of the invention.

As an example, the following illustrates the exchange of a crypto key present in the boot sector. Here, the term "crypto key" relates to digital keys used for the signing/signature check as well as to for the encryption/decryption. In the selected embodiment, the new key is to be transmitted into the control device not in the uncoded text but only in an encrypted manner, and the boot-up software is, in addition, protected against falsifications by means of a signature process. In both cases, a symmetrical method is used in the illustrated embodiment. In particular, the same symmetrical key is used in the illustrated embodiment for the signing/signature check and for the encryption/decryption.

FIG. 1 is a schematic view of a programmable control device 1 with memory contents corresponding to the embodiment. FIG. 1a relates to the condition before the implementation of the method according to the invention. The control device comprises a writable memory area 10 and a writable boot sector area 20. A control program 11 is stored in the memory area 10 and controls the original functions of the control device during the operation of the vehicle. A crypto key 21 is situated in the boot sector area 20. This crypto key 21 is to be replaced by a crypto key 22, in which case, after the conclusion of the process (FIG. 1b), the memory area 10 should again contain the control program 11.

In a schematic view, FIG. 2 shows process steps for the secured loading of the new crypto key 22. In a first main step 100, a signed boot-up software 123 is generated by combining the components and subsequent signing. For this purpose, the crypto key 22 (that is, the significant portion of the update software) is encrypted in a first partial step 110. The key used in this case should be selected such that a key 21 suitable for the decrypting is present in the control device 1. In the illustrated example, the crypto key 21 is also used for this purpose and the encrypted update software 111 is thereby generated. As an alternative, instead of the key 21, another key could also be used for the asymmetrical encrypting, a complementary key suitable for this other key being present in the control device. The encrypting of the update software protects the boot-up operation against unauthorized read access and, to this extent, also prevents future unauthorized writing interventions. However, this is not an absolutely necessary characteristic of the present invention.

In the subsequent partial step 120, the encrypted update software 111 is signed for a protection against falsifications.

In the illustrated embodiment, this takes place together with an application 121. The application 121 contains decryption software 122 suitable for decrypting the update software 111 in order to permit decrypting in the control device. If decryption software is already present in the control device, this software can be used, and the booting-up of a decryption software will not be necessary.

The key used for the signature calculation is, in turn, selected such that a key suitable for the signature check is present in the control device. In the illustrated embodiment, in which a symmetrical method is selected, the signature calculation and the signature check are carried out by means of the same key 21. The safety protection of a symmetrical method is only effective if the key used for this purpose can be kept secret. Instead of a symmetrical method, an asymmetrical method, such as a public-key method, can also be used. Also in the case of an asymmetrical method, the key used for the signature calculation is to be selected such that a key suitable for the signature check is present in the control device. If, for example, key 21 is to be used for the signature checking of an asymmetrical method, the signature calculation in process step 120 would have to be carried out by means of a key complementary to key 21.

In a second main step 200, the control device is loaded with the boot-up software 123. For this purpose, it is first stored in the memory area 10, in which case, in the illustrated example, it replaces the control program 11. The overwriting of already present data is not absolutely necessary for implementing the method according to the invention but, in practice, represents a frequently occurring necessity. As a rule, programmable control devices, for reasons of cost, are designed with respect to the available memory size for the applications required for operation. The reservation of memory for the boot-up software 123 does not take place. Therefore, in order to load this boot-up software 123 for implementing the method according to the invention, in practice, most data already present has to be overwritten because of the limited available memory space.

This is followed by a signature check in step 220, in the illustrated example by using the key 21. Conceivable alternatives were mentioned in the comments concerning step 120.

If the required approval is not achieved during the signature check, that is, an undesirable data change is detected, a previously adjustable sequence is triggered. For example, the control device rejects the booted-up software, so that the latter cannot be operated in the control device. In particular, also no change then takes place in the boot sector, and, to this extent, the control device is protected against unauthorized interventions. As an alternative, only a user warning could be triggered. In contrast, if the signature check is positive, the encrypted update software 111 as well as the boot-up software 121 are available in the memory area 10 of the control device in an executable manner.

For protecting the second main step 200, another safety mechanism may also be used as a signature check. For example, a certificate-based method or an encryption method may be used. In the simplest case, a protection can also be completely eliminated. However, in this case, the software to be booted up will not be protected against unauthorized interventions.

Also, in another embodiment, the transmission of boot-up software and update software into the control device may comprise separate steps. This particularly makes sense when, in an installation step to be executed first, a safety mechanism is loaded into the control device and activated, which is used for protecting a step to be executed later.

In another main step 300, the new key 22 is filed at the location of the old key 21 as a result of the execution of the boot-up software 121, 122.

For this purpose, first in a partial step 310, by executing the decryption software 122 contained in the boot-up software 121, the new key, so far transmitted only in an encrypted form is restored to the uncoded form 22 and, in the subsequent partial step 320, is filed in the boot sector 20 at the location of the previous key 21.

As a result, the principal object of the illustrated example, specifically the exchange of the keys in the boot sector, is already achieved. The subsequent process steps concern the restoration of the control program 11 in the memory 10 of the control device.

In main step 400, the software to be booted up, including the control program 11, is prepared for this purpose. In the present example, step 400 essentially consists of the signing of the control program 11. Here, changes of the safety mechanisms carried out in the previous process steps in the boot sector should be taken into account. If, for example, in addition to, or instead of the exchange of the keys 21, 22, a change of the safety mechanism took place, for example, changes of the key length or the replacement of a symmetrical signature process by an asymmetrical signature process or a certificate-based process, the software to be booted up would have to be adapted to this new safety mechanism.

In the illustrated example, a symmetrical process is maintained, and key 22 is used for the signature calculation in step 400. As an alternative, as mentioned above, another key present in the control device can also be used.

In another main step 500, the control device is loaded with the control software 11, specifically while taking into account the implemented updating of the safety mechanisms in the boot sector of the control device. In the present example, it is transmitted in a signed manner and, in step 510, is stored in memory area 10, specifically at the location of the boot-up software 121. In a later step 520, a verification of the imported software takes place. In the illustrated example, a signature check is performed by using key 22. Conceivable alternatives were discussed above in connection with step 400.

If the signature check is positive, the control software 11 is now present in the memory area 10 of the control device in an executable manner. On the whole, the target condition illustrated in FIG. 1b is reached. If the required approval were not obtained during the signature check, this would indicate that the target condition illustrated in FIG. 1b was missed; that is, either the updating of the boot sector was not successful or an undesirable data change took place when the control software 11 was reintroduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of booting up an update software in a writable memory area of a boot sector of a programmable control device of a vehicle, comprising the steps of:

providing a boot-up software that can be booted up in a writable memory area located outside the boot sector of the programmable control device, wherein the boot-up software can install the update software in the writable memory area of the boot sector;

booting up the boot-up software and the update software in the writable memory area situated outside the boot sector;

executing the boot-up software in the programmable control device in order to install the update software in the writable memory area of the boot sector; and applying a signature process to at least a portion of the boot-up software or to the update software, wherein the at least a portion of the boot-up software or update software is signed before its transmission into the programmable control device by a first signature key and, after its transmission into the programmable control device is checked with respect to its integrity by means of a second signature key filed in the programmable control device.

2. Method according to claim 1, wherein the update software is contained in the boot-up software.

3. Method according to claim 2, further comprising the step of exchanging a key filed in the boot sector of the programmable control device for a new key.

4. Method according to claim 2, further comprising the step of:

restoring memory contents of the boot sector of the programmable control device after an uncontrolled physical change or for a subsequent introduction, expansion or updating of software-based safety mechanisms.

5. Method according to claim 2, further comprising the step of:

filing the second signature key in the writable memory area of the boot sector.

6. Method according to claim 5, wherein the signature process is an asymmetrical signature process, the first signature key and the second signature key forming a complementary pair of keys.

7. Method according to claim 6, further comprising the steps of:

encrypting and decrypting, wherein at least a portion of the boot-up software or of the update software, before the transmission into the control device, is encrypted by means of an encryption key and, after the transmission into the control device, is decrypted by a decryption software by means of a decryption key filed in the control device.

8. Method according to claim 7, wherein the decryption key is filed in the writable memory area of the boot sector.

9. Method according to claim 8, wherein the decryption software is contained in the boot-up software.

10. Method according claim 9, wherein a symmetrical encryption method is used, and the encryption key and the decryption key are identical.

11. Method according claim 9, wherein an asymmetrical encryption method is used, and the encryption key and the decryption key form a complementary pair of keys.

12. Method according to claim 11, wherein the first signature key and the encryption key are identical, and the second signature key and the decryption key are identical.

13. Method according to claim 11, wherein the first signature key and the encryption key are different, and the second signature key and the decryption key are different.

14. Method according of claim 5, wherein the signature process is a symmetrical signature process, and the first and the second signature keys are identical.

15. Method according to claim 14, further comprising the steps of:

encrypting and decrypting, wherein at least a portion of the boot-up software or of the update software, before the transmission into the control device, is encrypted by means of an encryption key and, after the transmission into the control device, is decrypted by a decryption software by means of a decryption key filed in the control device.

16. Method according to claim 15, wherein the decryption key is filed in the writable memory area of the boot sector.

17. Method according to claim 16, wherein the decryption software is contained in the boot-up software.

18. Method according claim 17, wherein a symmetrical encryption method is used, and the encryption key and the decryption key are identical.

19. Method according claim 17, wherein an asymmetrical encryption method is used, and the encryption key and the decryption key form a complementary pair of keys.

20. Method according to claim 16, wherein the first signature key and the encryption key are identical, and the second signature key and the decryption key are identical.

21. Method according to claim 16, wherein the first signature key and the encryption key are different, and the second signature key and the decryption key are different.

* * * * *